(12) United States Patent
Dasilva

(10) Patent No.: US 6,986,250 B2
(45) Date of Patent: Jan. 17, 2006

(54) MASTER CYLINDER BLEEDING TOOL

(75) Inventor: Ilidio Dasilva, Thornhill (CA)

(73) Assignee: AutoZone, Inc., Memphis, TN (US)

( * ) Notice: Subject to any disclaimer, the term of this patent is extended or adjusted under 35 U.S.C. 154(b) by 8 days.

(21) Appl. No.: 10/780,678

(22) Filed: Feb. 19, 2004

(65) Prior Publication Data

US 2005/0183420 A1    Aug. 25, 2005

(51) Int. Cl.
*B60T 11/30* (2006.01)

(52) U.S. Cl. ........................................................ 60/584

(58) Field of Classification Search ................. 60/584, 60/572; 188/352
See application file for complete search history.

(56) References Cited

U.S. PATENT DOCUMENTS 4,236,549 A    12/1980   Salzmann
4,800,725 A *   1/1989   Kaulig et al. ................. 60/584
5,381,662 A *   1/1995   Ethen et al. ................... 60/584
5,524,736 A     6/1996   Korshak

OTHER PUBLICATIONS

"Master Cylinder Installation & Bleeding Instructions", Autocat Catalogue Services Inc. 2002, MCIB02, Issued Apr. 25, 2001, 2$^{nd}$ Revision, pp1-2.

* cited by examiner

*Primary Examiner*—Thomas E. Lazo
(74) *Attorney, Agent, or Firm*—Howrey LLP

(57) ABSTRACT

A tool for bleeding a master cylinder when the master cylinder is unattached to a vehicle. In an exemplary embodiment a bleeding tool includes a shaft attached by means of clamp rods to a master cylinder flange, a clamp handle rotatable with respect to the shaft, and a push rod coupled to the clamp handle through a movable rotatable joint. In an exemplary embodiment, the maximum motion of the push rod during a bleeding cycle is defined by a set of two pins disposed on a ring concentric with the shaft.

15 Claims, 9 Drawing Sheets

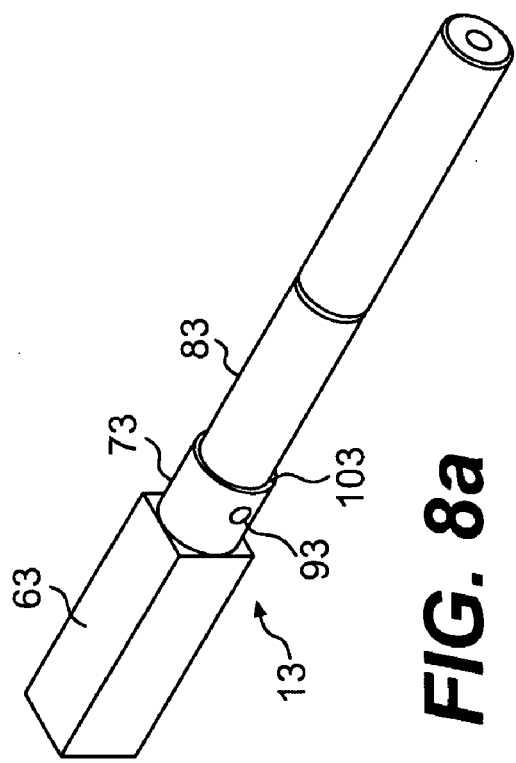
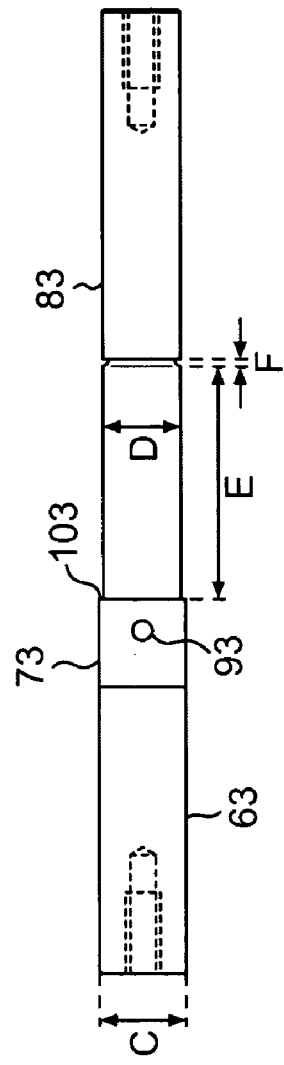
FIG. 8a
FIG. 8b

MASTER CYLINDER BLEEDING TOOL

BACKGROUND

1. Field of the Invention

The present invention relates to an apparatus and method for convenient purging of air from a brake master cylinder assembly, while detached from an automobile, thus filling the master cylinder with brake fluid.

2. Background Information

Before a master cylinder of a brake system can be properly and safely used in a motor vehicle, it must be purged of air or other gasses, and filled with brake fluid. The purging of air, often referred to as "bleeding," is performed when the vehicle is first manufactured, and may also be required periodically during the service life of the vehicle. In either case, purging of air is required for successful operation under the pressure normally imparted to the system to operate the brakes.

Bleeding may be performed while a master cylinder is attached to a vehicle, or alternatively, while a master cylinder is free-standing. In the latter approach, the master cylinder is typically placed within a fixture, such as a vise. Flow conduits are connected to fluid pressure outlets on the cylinder, typically one or two in number, and the free ends of the conduits are positioned to discharge pressurized brake fluid from a working chamber of the master cylinder (bore) back into a master cylinder reservoir. A piston in the master cylinder is repeatedly stroked to pressurize brake fluid within the bore, and force the brake fluid outwardly through the outlets and back into the reservoir. The result of such repeated pressurization of the braking fluid is the expulsion of any entrained gas bubbles within the master cylinder.

Typically, a mechanic performing the above procedure may employ a common tool such as a Phillips head screwdriver to depress the piston. However such a procedure suffers from the fact that an operator may fail to utilize proper force during each pressurization. During a typical bleeding process, a large degree of leverage is required to properly depress a piston, causing an operator to fail to depress the piston in a consistent manner during each pressurization. Additionally, the tool employed may slip from the operator's hand, or the master cylinder may rotate or slip within the vise, due to improper or inadequate gripping.

Alternatively, in the former case where a master cylinder is already mounted within a vehicle, bleeding typically requires an operator to mechanically depress the mechanism leading from the brake pedal to the master cylinder piston, while additionally monitoring the presence of bubbles within the system.

In both of the aforementioned cases, an operator must manually actuate the master cylinder piston while also arranging to pinch off the bleed line or lines during each retraction of the piston, so as to prevent backflow of the brake fluid through the bleed lines, a cumbersome process at best.

In light of the forgoing, it is clear that a need exists for a device and method to more conveniently perform bleeding of a master cylinder.

SUMMARY OF THE INVENTION

The present invention provides an apparatus, namely a bleeding tool, for promoting convenient and successful purging of a master cylinder. In a preferred embodiment, the master cylinder bleeding tool can be securely attached to a master cylinder, whereupon bleeding is conducted. The bleeding tool is then detached from the master cylinder and the master cylinder then installed in a vehicle. Preferably, the bleeding tool mechanically mounts to the flange of the master cylinder, and a movable screw rod included as part of the tool is in contact with the master cylinder piston. By use of a lever connected to the movable rod, an operator may depress and retract the master cylinder piston with one hand, without slippage or uneven motion during the process of bleeding.

DESCRIPTION OF THE DRAWINGS

FIGS. 8a and 8b illustrate a shaft component of a master cylinder bleeding tool according to a preferred embodiment of the present invention.

DETAILED DESCRIPTION

Figure 1A:
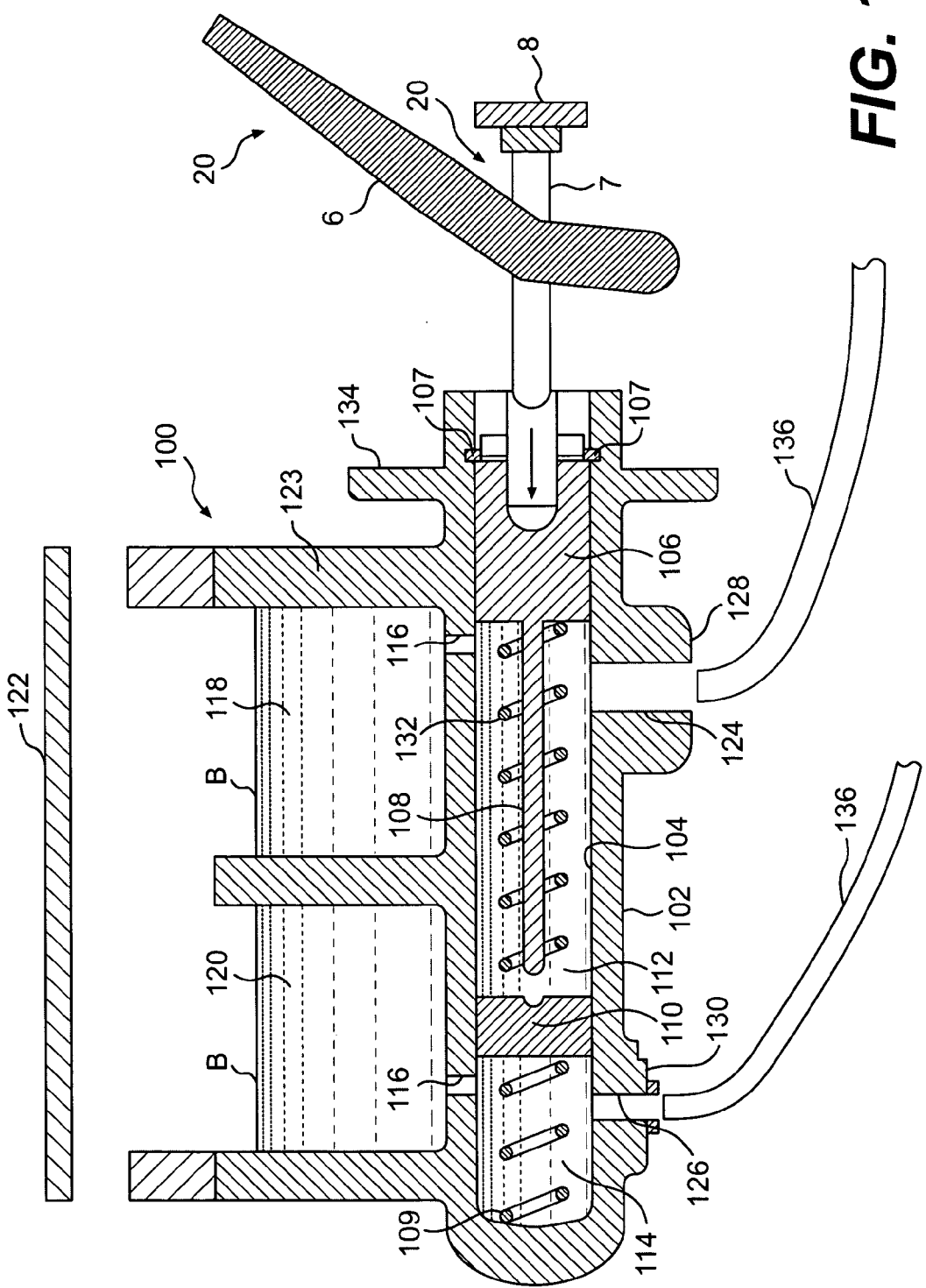
FIG. 1a depicts a cross-sectional view of a conventional master cylinder and a cross-sectional schematic view of several elements of a master cylinder bleeding tool according to a preferred embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

Referring now to FIG. 1a, a master cylinder of the type with which the bleeder tool of the present invention finds application is depicted in cross-section at 100. The master cylinder 100 is of known design and is representative of master cylinders employed in motor vehicle braking systems. It will be understood that the master cylinder 100 is illustrated for descriptive purposes only, and that the present invention finds application with other master cylinder designs. Furthermore, components significant to the invention are shown, and other components are omitted for clarity. Also illustrated in FIG. 1a is a cross-section of a portion of master cylinder bleeding tool 20.

Master cylinder 100 is conventional, and the significant components and operation will be briefly reviewed. Master cylinder 100 includes a conventional housing 102 and main bore 104. Main bore 104 is seen to be open to the atmosphere at the end to the right, as shown in the FIG. 1a. A primary piston 106 occupies main bore 104 and is retained by a clip 107. Primary piston 106 has a finger 108 which will contact a secondary piston 110 after a limited degree of travel. Pistons 106 and 110 are slidably disposed within main bore 104, and develop a pressure when urged to the left. Thus, two high pressure chambers 112, and 114, are defined within main bore 104.

Brake fluid B is supplied to chambers 112 and 114 through respective passageways 115, 116 communicating between each of two reservoirs 118 and 120 for storing brake fluid. The reservoir unit 123 may be integrated into master cylinder housing as depicted in FIG. 1a, or comprise a detachable fluid reservoir unit. In normal use, a cover 122 is mounted to seal an upper end of the reservoir unit 123.

The housing 102 defines a pair of outlet ports 124 and 126, which have direct communication with the bore 104 and are threaded within their outer ends at 128 and 130, to accept a threaded compression nut (not shown) which secures a brake line (not shown) thereto when the master cylinder is permanently connected to a brake system. When detached from a vehicle for bleeding, a set of flexible conduits (bleed lines) may be attached at ends 128 and 130.

A coil compression spring 132 is disposed between the closed end of the bore 104 and the inner end of the piston 106 to normally urge the piston to an axially outward position relative to the bore 104. In operation when installed in a vehicle, the spring 132 urges the piston means 106 outwardly against the inner end of an actuating rod (not shown) or a linkage (also not shown), which are connected to a brake pedal lever (not shown).

In an embodiment of the present invention, the bleeder tool 20 is mounted to master cylinder 100 using a flange portion 134 of housing 102, described below in more detail. A pair of bleeder lines or hoses 136 are then connected to outlet ports 124 and 126 at one end and their free ends directed into the reservoir chambers 118 and 120. When mounted to master cylinder 100, bleeder tool 20 may be actuated to stroke the piston 106 axially inwardly to compress the brake fluid disposed within the pressure chambers 112 and 114, and effect outward flow of pressurized brake fluid through the outlet ports 124 and 126. As the piston 106 moves in a direction to pressurize the brake fluid and subsequently is returned with the action of spring 132 to its outward position (the operation comprising one bleed cycle), bleeding of the master cylinder is accomplished.

Figure 1B:
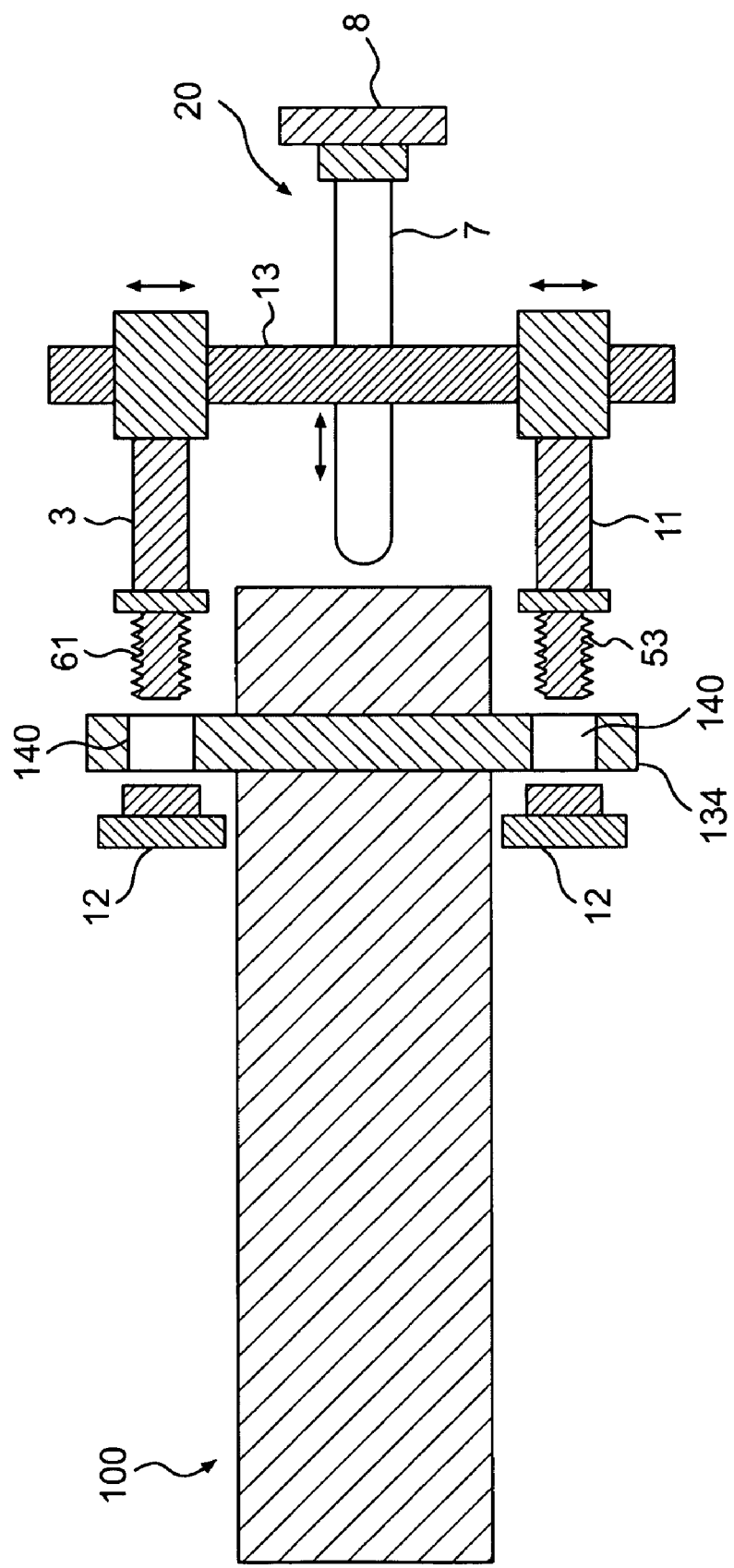
FIG. 1b depicts a top view of a conventional master cylinder and a top schematic view of several elements of a master cylinder bleeding tool according to a preferred embodiment of the present invention.

FIG. 1b illustrates a top view of master cylinder 100 and selected elements of tool 20. Bleeding tool 20 includes clamp rods 3 and 11 for attaching to master cylinder flange 134 using threaded ends 53 and 61, respectively, and nuts 12. Typically, the master cylinder flange comprises a flat object that circumferentially surrounds the bore region 104 of the master cylinder and is located near the end containing the bore opening, as illustrated in FIGS. 1a and 1b. Master cylinder flange 134 includes a pair of small hollow bores 140 whose centers are typically arranged along the axis of a line running through the center of the master cylinder bore. As depicted in FIG. 1b, the bores (holes) lie on opposite sides of the flange The threaded ends 15 are inserted through bores 140. Screw rod 7 attached to handle 8 provides an urging force against piston 106 (not shown) in master cylinder 100 when handle 6 (not shown; see FIG. 1a) is rotated toward the master cylinder. Thus, in an embodiment of the present invention, screw rod 7 acts in lieu of a conventional push rod, which engages piston 106 when master cylinder 100 is installed in a vehicle.

Figure 2B:
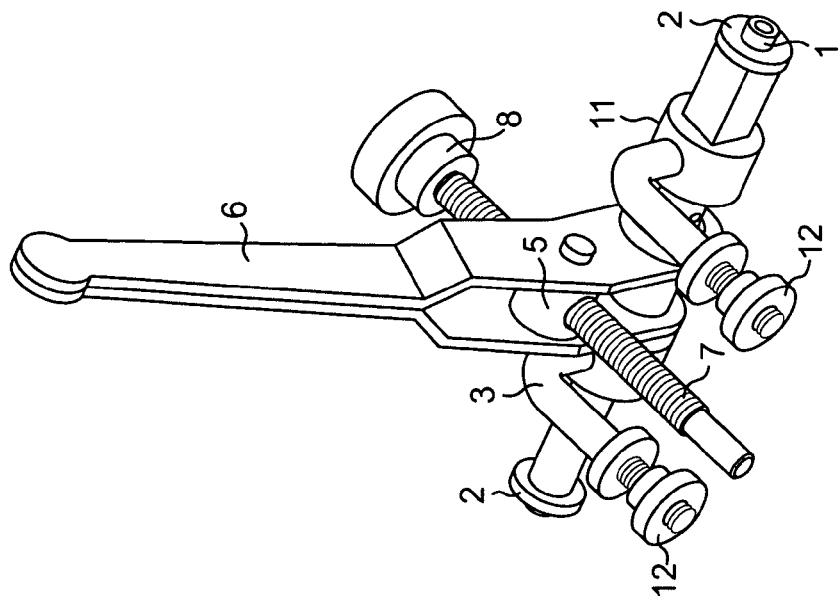
FIGS. 2a and 2b depict exploded and assembled perspective views, respectively, of a master cylinder bleeding tool according to a preferred embodiment of the present invention.
Figure 2A:
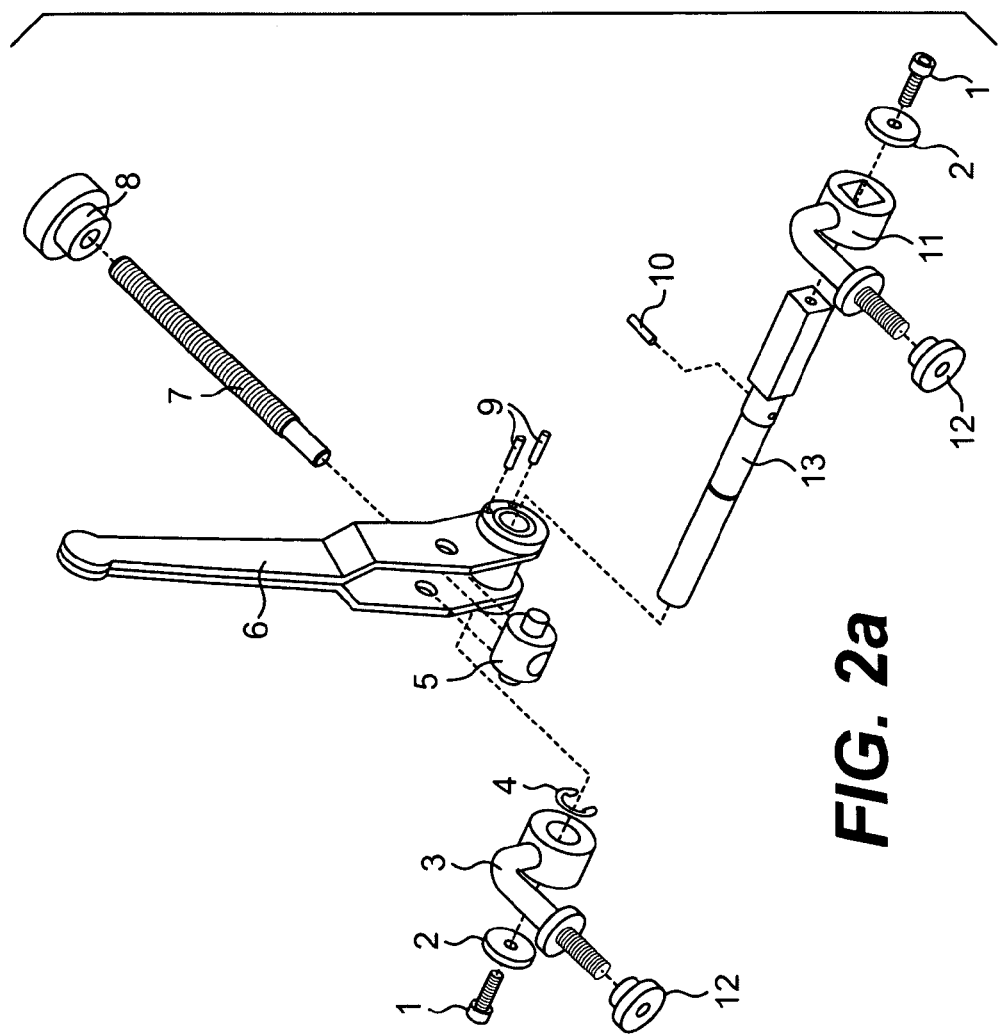
Figure 3:
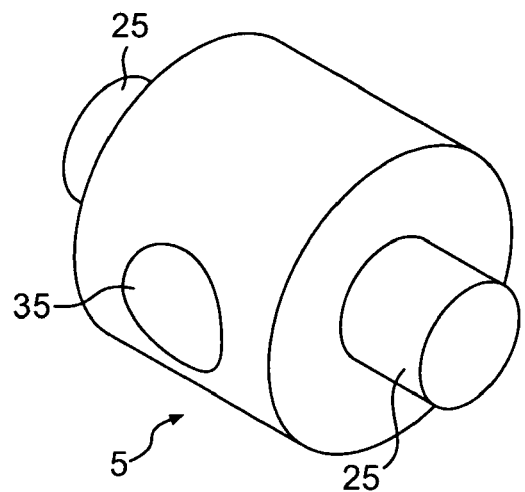
FIG. 3 depicts details of a screw rod joint of a master cylinder bleeding tool according to a preferred embodiment of the present invention.
Figure 4A:
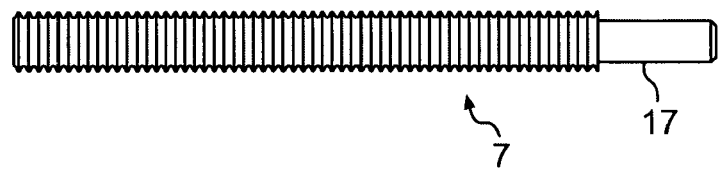
FIGS. 4a and 4b are perspective views of a screw rod component of a master cylinder bleeding tool according to a preferred embodiment of the present invention.
Figure 4B:
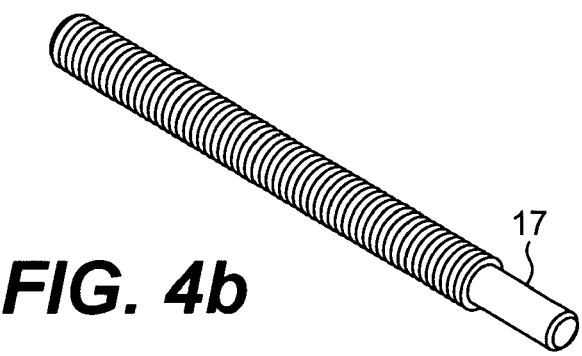

FIGS. 2 and 3 illustrate details of a master cylinder bleeding tool 20, according to a preferred embodiment of the present invention. Tool 20 includes a clamp handle 6, in mechanical communication with shaft 13, to which are mounted clamp rods 3 and 11. As indicated above, the pair of clamp rods provide means for attaching to a typical master cylinder flange, which typically includes a pair of bores for accepting threaded rods used for attachment of the master cylinder to a vehicle. Screw rod 7 is attached to clamp handle 6 by means of a rotatable cylindrical screw rod joint 5. As illustrated in FIG. 2b, when master cylinder tool 20 is fully assembled, the body of screw rod joint 5 is disposed between two prongs in a lower portion of handle 6. FIG. 3 illustrates further details of joint 5, which is secured using two ends 25 whose diameter is narrower than the body to provide for insertion in opposed circular holes fabricated in each prong of handle 6. A threaded cylindrical bore 35 within joint 5, arranged to run perpendicular to cylinder axis of joint 5, accommodates threaded screw rod 7, which is depicted in more detail in FIGS. 4a and 4b. When threaded within bore 35, clockwise rotation of rod 7, using handle 8, causes the unthreaded end portion 17 of the rod to move away from joint 5 and clamp handle 6.

Figure 5:
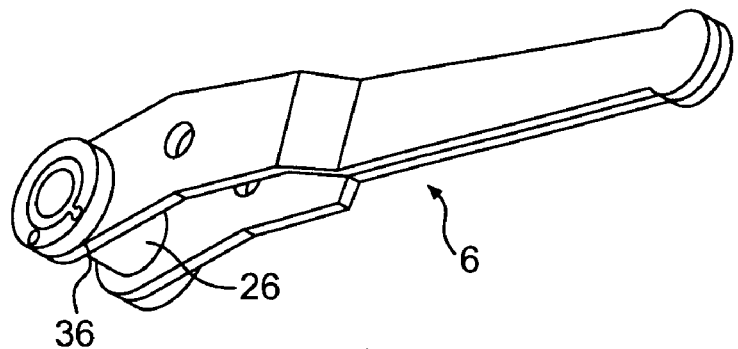
FIG. 5 is a perspective view of a handle component of a master cylinder bleeding tool according to a preferred embodiment of the present invention.
Figure 6A:
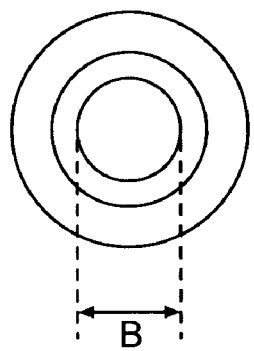
FIGS. 6a and 6b illustrate a fixed joint component of a master cylinder bleeding tool according to a preferred embodiment of the present invention.
Figure 6B:
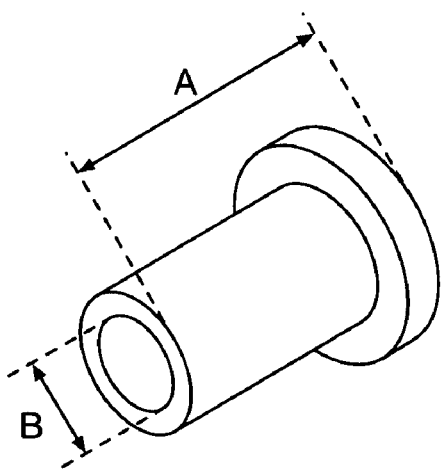
Figure 7A:
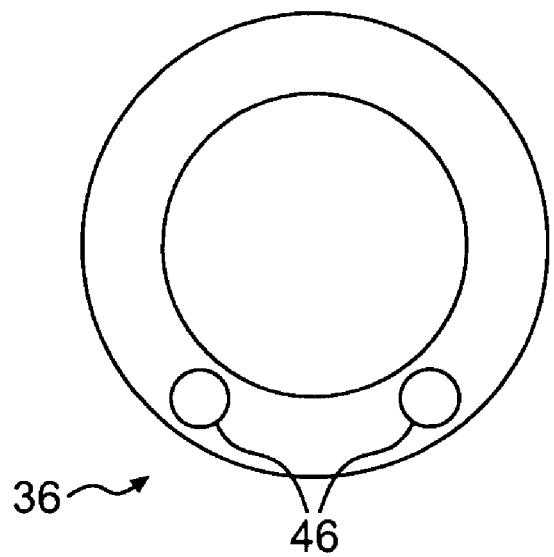
FIGS. 7a and 7b illustrate a clamp handle hold ring component of a master cylinder bleeding tool according to a preferred embodiment of the present invention.
Figure 7B:
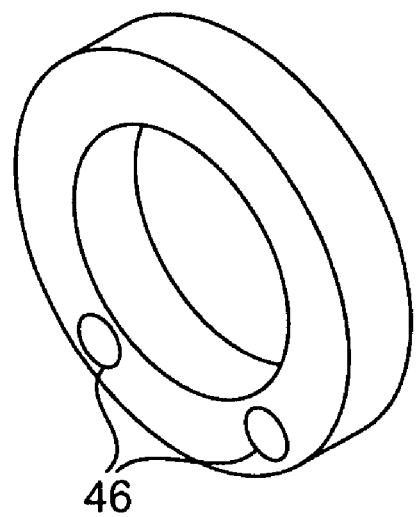

The extreme lower portion of clamp handle 6 includes a hollow cylindrical joint portion 26 as depicted in FIG. 5. Shaft 13 is accommodated by joint 26 by insertion through the hollow portion therein. Preferably joint 26, depicted in more detail in FIGS. 6a and 6b, is permanently affixed to clamp handle 6. Circumferentially surrounding one end of joint 26, disposed on an outer surface of a prong of handle 6, is a cylindrical hold ring 36, as depicted in FIG. 5. The hold ring 36 is affixed to handle 6 and/or joint 26, such that it cannot rotate independent of handle 6, but rather rotates in unison with handle 6. Details of ring 36 are illustrated in FIGS. 7a and 7b. The outer flat surface of hold ring 36 contains two shallow holes 46, that accommodate a pair of pins 9, illustrated in FIG. 2a. In an exemplary embodiment, the holes accommodate pins whose long axis is oriented parallel to the cylindrical axis. In a preferred embodiment, the holes are placed about 80 degrees apart on the ring. In other words, when placed in the holes, the smaller angle subtended by a circular arc connecting the pins is about 80 degrees. In an exemplary embodiment, pins 9 are permanently affixed to hold ring 36.

As illustrated in FIGS. 8a and 8b, shaft 13 includes an approximately rectangular cross-section end portion 63 attached to a short cylindrical portion 73 having a relatively larger diameter, which is, in turn, attached to a longer cylindrical portion 83, having a relatively smaller diameter. A small bore 93 in cylinder 73 is used to accommodate a stop pin 10, as further illustrated in FIG. 2a. When tool 20 is fully assembled (see FIG. 2b), stop pin 10 protrudes from shaft 13 at a position that places the stop pin 10 between pins 9 which protrude from hold ring 36 at right angles to the stop pin. Pins 9 thus act to define the range of axial rotation possible for handle 6 with respect to shaft 13, by restricting the rotation of pin 10 to a range between the two pins 9. As noted above, in an exemplary embodiment, this range is about 80 degrees.

Preferably, the outer diameter of cylinder 73 is larger than the inner diameter of clamp ring 36, such that joint 26, and thereby clamp handle 6, come to rest against surface 103 of cylinder 73 when clamp 6 is urged in the direction of end portion 63. Additionally, portion 93 contains a narrow cylindrical slot that can accommodate e-ring 4 depicted in FIG. 2. E-ring 4 acts to restrict motion of clamp handle 6 along on the axis of shaft 13 in the direction away from end 63. In order to accommodate joint 26 along shaft 13 when e-ring 4 is in place, the distance between surface 103 and the inner edge of the clamp ring slot (clamp handle zone), must be as great or larger than the length of joint 26. In a preferred embodiment, the length of the clamp handle zone is greater than the length of joint 26 by a value of about 0.10"or less.

Figure 9A:
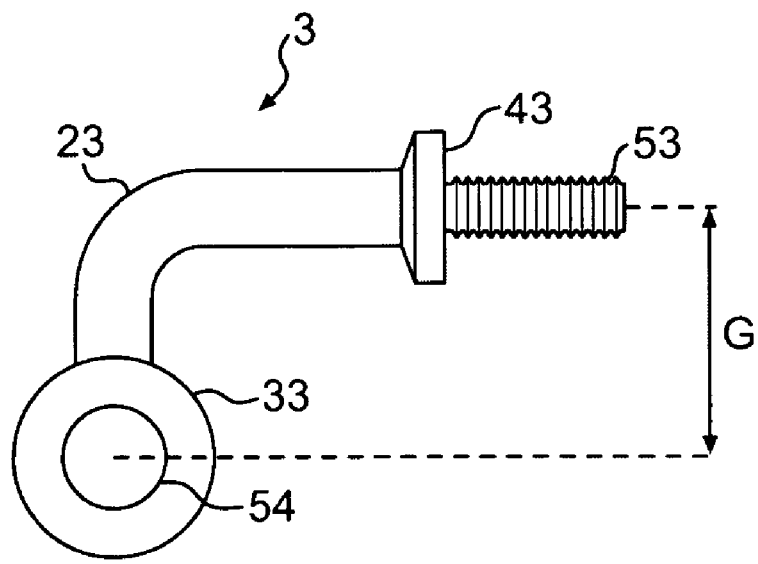
FIGS. 9a and 9b illustrate a first clamp rod component of a master cylinder bleeding tool according to an embodiment of the present invention.
Figure 9B:
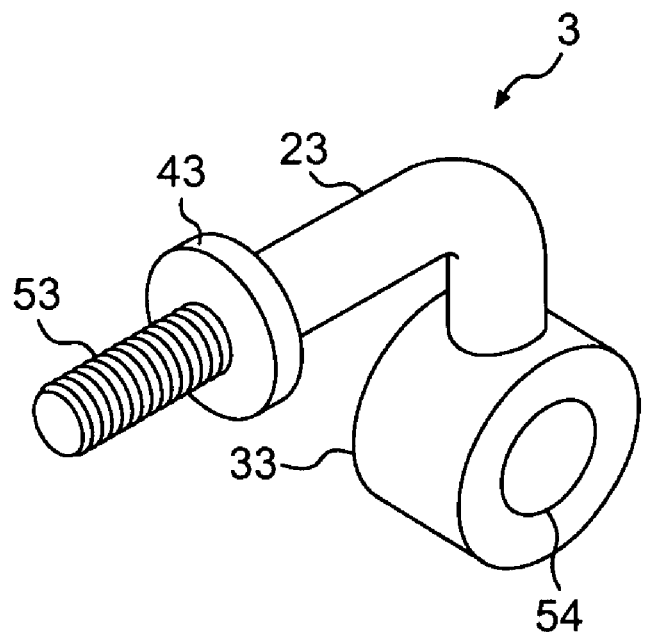

FIGS. 9a and 9b depict further details of clamp rod 3, which includes a bent rod section 23 that imparts an overall L-shape to the clamp rod. Section 23 is attached to attached on one end to a hollow cylinder "head" portion 33 in which the bore ("eye") is circular in shape. On the other end, section 23 is attached to a bolt-like portion containing a flared ring 43 for engaging a master cylinder flange bore 140, and a threaded rod portion 53. Also included with clamp rod 3 is a nut 12 as previously described with respect to FIG. 1b. The inner bore 54 of cylinder 33 is in the shape of a cylinder whose diameter is sufficient to accommodate cylindrical region 83 of shaft 13.

Figure 10A:
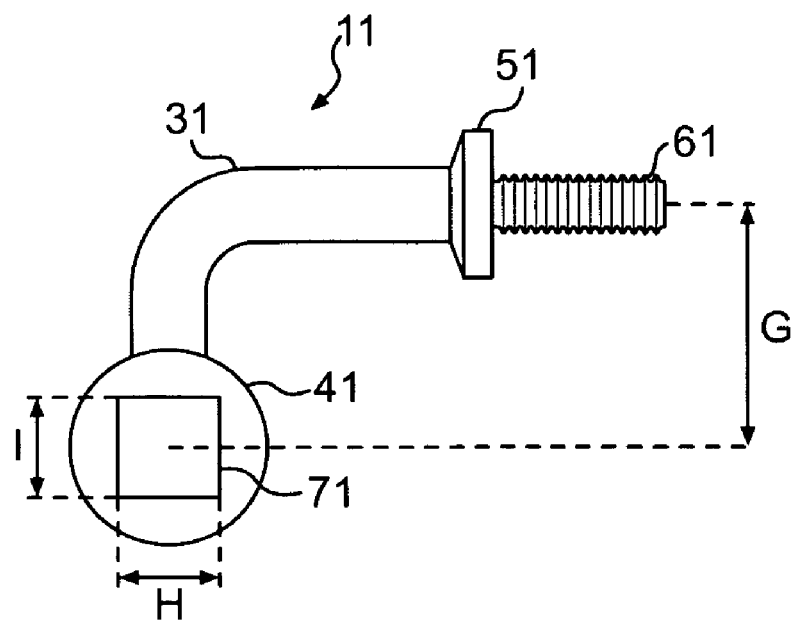
FIGS. 10a and 10b depict a second clamp rod component of a master cylinder bleeding tool according to an embodiment of the present invention.
Figure 10B:
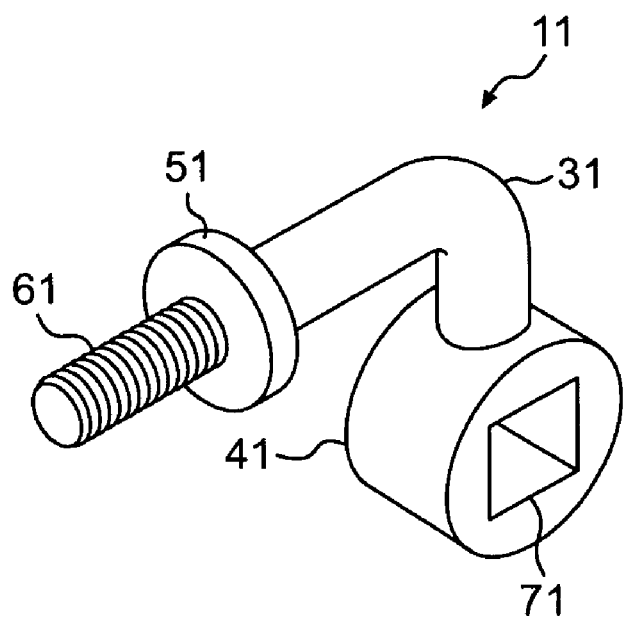

FIGS. 10a and 10b depict details of clamp rod 11, which, like clamp rod 3, includes a bent rod 31 portion attached to a hollow cylinder head portion 41 on one end and a flared ring 51 attached to a threaded rod 61 on the other end. In an exemplary embodiment, the "eye" region 71 of head 41 contains an approximately rectangular cross-section bore, whose dimensions are sufficiently large to accommodate the end 63 of shaft 13. Preferably, end 63 has an approximately square cross-section and eye 71 has an approximately square cross-section. In a preferred embodiment, the length of a side of the eye 71 is greater than the length of a square side of end portion 63 by a value of about 0.001 to 0.005 inches.

As described above, clamp rods 3 and 11 are secured to a master cylinder flange during bleeding by means of nuts 12, as illustrated in FIG. 1b. When tool 20 is fully assembled, shaft 13 is slidably disposed within hollow cylinders 33 and 41 of clamp rods 3 and 11, respectively. This allows master cylinder tool 20 to be mounted to master cylinder mounting flanges of varying diameter, where the spacing between mounting holes on the mounting flanges can vary. In a preferred embodiment, master cylinder bleeding tool 20 can be mounted onto mounting flanges in which the hole spacing may vary between 3 to 5 inches. The ends of shaft 13 are secured using screws 1 and hold rings 2 to limit the relative motion of clamp rods 3 and 11.

The following table illustrates dimensions for various elements of the master cylinder bleeding tool depicted in the above drawings, according to an exemplary embodiment of the present invention.

| List of reference symbols | Dimension |
| --- | --- |
| A | 1.287" |
| B | 0.4375" |
| C | 4.997–4.999" |
| D | 0.4355–0.4375" |
| E | 1.335" |
| F | 0.04" |
| G | 1.25" |
| H | 5.000–5.002" |
| I | 5.000–5.002" |

Referring again to FIG. 2, an illustration of fully assembled tool 20 is provided. In order to mount tool 20 to a master cylinder, an operator first ensures that clamp nuts 12 are removed from both clamp rods 3 and 11. In addition, rod 7 is retracted within joint 5 by counterclockwise rotation to ensure that it does not contact the master cylinder piston during attachment of the tool to the master cylinder flange. Referring again to FIG. 1b, the clamp rods are then slidably positioned along shaft 13, such that the separation of ends 15 is approximately the same as the separation of bores 140. Ends 15 are then inserted through bores 140 and secured with nuts 12. As depicted in more detail in FIG. 1a, rod 7 may then be moved towards master cylinder 100 in order to engage piston 106 at a concave depression on the outer surface of the piston. The motion of rod 7 towards piston 106 may be effected by a combination of two operations. Firstly, clockwise rotation of rod 7 may be used to bring the unthreaded end 17 near to or in contact with the outer surface of piston 106. Additionally, rotating lever 16 towards master cylinder flange 133 serves to move rod 7 toward piston 106, and provide a force urging piston 106 inwardly after rod 7 contacts the piston surface.

Typically, with top pin 9 of joint 26 resting on pin 10, rod 7 is threaded within joint 5 such that it comes near or into contact with piston 106. Preferably, an operator ceases rotation of rod 7 before enough force is developed to displace a master cylinder piston. Once clockwise rotation of rod 7 is sufficient so that contact is made between end 17 and piston 106, further clockwise rotation of rod 7 serves to develop a force urging piston 106 inwardly. Continued clockwise rotation then may result in generating enough force to displace piston 106 inward. After bleed lines are properly attached, the master cylinder is subsequently bled using a series of bleed cycles in which each cycle includes rotation of handle 16 towards master cylinder 100, followed by release of the handle.

Tool 20 can be used so that the amount of travel of master cylinder piston 106 can be precisely defined and varied. During a bleed cycle, handle 16 rotates towards piston 106, while pin 10 is held fixed by clamp rod 11, which prevents rotation of shaft 6 at end 63. In order to maximize piston displacement, rod 7 is threaded in a clockwise manner to a point in which end 0.17 contacts piston 106 when upper pin 9 is in contact with pin 10. Subsequently, upon rotation of handle 16 towards piston 106, the piston is displaced inwardly through the entire rotation of hold ring 36 from the point at which upper pin 9 contacts pin 10 to the point at which lower pin 9 contacts pin 10. In an exemplary embodiment, the maximum piston displacement is about 1.5", but other displacements, larger or smaller, may be more suitable in view of the particular application and type of master cylinder being targeted. In the above example, a maximum piston displacement during each bleeding cycle may be conveniently effected, provided an operator rotates handle 7 inwardly to the maximum permissible extent each cycle.

Alternatively, bleeding with shallower piston displacement in each cycle may be performed in a reproducible manner by threading rod 7 such that contact with piston 106 is not made when upper pin 9 is in contact with pin 10. In the latter case, as handle 7 is initially rotated inwardly (towards the flange of the master cylinder), upper pin 9 rotates in a counterclockwise fashion away from pin 10, and lower pin 9 rotates toward pin 10 before rod 7 contacts piston 106. Thus, hold ring 26 (and handle 16) subsequently rotates through a smaller angle between the point at which piston contact is made, and the point at which lower pin 9 contacts pin 10, resulting in a smaller displacement of pin 106.

Another feature of tool 20 according to an exemplary embodiment of the present invention, is that rod 7 maintains an orientation substantially parallel to the displacement of piston 106 during bleeding and a position coincident with the axis through the center of the piston. Referring to FIGS. 9a, 9b, 10a and 10b, it is to be noted that for both clamp rods 3 and 11, the vertical distance drawn perpendicular from a line through the center of the mounting ends and a line drawn through the center of the eye is about 1.25", the same as the distance between the center of the acceptance holes for screw rod joint 5 and shaft 13 in handle 6 (see FIG. 5). When rod 7 first contacts piston 106, and the orientation of the lower part of clamp handle 6 is close to perpendicular with respect to the axis of piston bore 104, the center of screw rod joint 5 is approximately in the plane that runs through the center of the threaded ends 53 and 61 of clamp rods 3 and 11, respectively. Assuming that mounting holes on flange 134 intersect a horizontal plane that lies through the center of bore, this results in the vertical position of rod 7, which feeds through the center of screw rod joint 5, being coincident with the center of piston 106.

Subsequently, as handle 16 is rotated towards piston 106, the center of screw rod joint 5 along its cylindrical axis is translated toward piston 106. At the same time, screw rod joint 5 is free to rotate with respect to handle 6, and tends to maintain rod 7 in a substantially parallel position with respect to piston 106. Thus, compression force on piston 106 is maintained near the center of rod 7 during the bleeding, resulting in a mechanically stable procedure during the entire bleed cycle.

A further feature of master cylinder bleeding tool 20 according to an embodiment of the present invention, is the adaptability for mounting to a master cylinder mounting flange. In particular, in addition to the fact that tool 20 can mount to flanges in which the hole spacing varies between about 3 and 5 inches, tool 20 can also mount to flanges in which the holes do not lie on a center line through the corresponding master cylinder bore. When so mounted, the rotatability of screw rod joint 5 within clamp handle 6, provides for rod 7 to engage a piston head and effect proper bleeding, even if screw rod joint 5 lies substantially off center with respect to the cylinder bore center line.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A master cylinder bleeding tool, comprising:
   a shaft including a first portion having a cylindrical cross-section;
   a first clamp rod and a second clamp rod, each slidably disposed on the shaft and designed for temporarily affixing the shaft to a master cylinder;
   a clamp handle wherein a lower portion of the clamp handle includes two prongs connected by a fixed joint, wherein the prongs are rotatably coupled to the cylindrical portion of the shaft;
   a screw rod joint rotatably coupled to the clamp handle; and
   a screw rod including a threaded portion, wherein the screw rod is coupled to the clamp handle by threading the screw rod within a cylindrical bore in the screw rod joint.

2. The bleeding tool of claim 1, wherein the shaft includes a second portion having an approximately rectangular cross-section, and wherein the second clamp rod defines an eye whose shape and size are about the same as the shape and size of the rectangular cross-section of the second portion of the shaft,
   whereby the shaft is substantially prevented from rotation during rotation of the clamp handle.

3. The bleeding tool of claim 2, wherein the second portion has an approximately square cross-section.

4. The bleeding tool of claim 2, wherein the first and second clamp rods have an L-shape, wherein the shaft axis lies below the imaginary line connecting the two holes on opposite sides of the flange.

5. The bleeding tool of claim 4, wherein slidable travel of the first and second clamp rods along the shaft is sufficient to accommodate mounting to flanges whose mounting hole separation varies between about 3 to 5 inches.

6. The bleeding tool of claim 4, wherein the distance between the center of the screw rod joint and the center of the fixed joint is about the same as the perpendicular distance between the center of the eye of a clamp rod and the projection of a line through the center of a threaded end of the clamp rod.

7. The bleeding tool of claim 1, wherein the first and the second clamp rods each include a threaded end and nut, such that the first and second clamp rods connect to a master cylinder flange by means of a pair of holes disposed on opposite sides of the flange.

8. The bleeding tool of claim 7, further comprising:
   a hold ring concentric with the shaft and affixed to the clamp handle, wherein the hold ring rotates in unison with the shaft; and
   an upper pin and a lower pin, wherein the long axis of the pins runs parallel to the shaft, and wherein the upper and lower pins are affixed to the hold ring.

9. The bleeding tool of claim 8, wherein an angle subtended by a circular arc connecting the upper and lower pins is about ninety degrees.

10. The bleeding tool of claim 8, further comprising a shaft pin connected to the shaft, wherein the shaft pin engages the upper pin and lower pin, whereby the maximum clamp handle angular rotation is defined by an angle subtended by a circular arc connecting the upper and lower pins.

11. The bleeding tool of claim 10, wherein the maximum clamp handle rotation is about 80 degrees.

12. The bleeding tool of claim 8, further comprising:
a third portion of the shaft, having a cylindrical cross section and positioned adjacent to the first portion of the shaft, wherein the diameter of the third portion of the shaft is larger than the inner diameter of the hold ring; and
an external e-ring reversibly positioned within a notch in a notch region, wherein the outer diameter of the e-ring is larger than the inner diameter of the fixed joint, whereby the lateral motion of the clamp handle along the shaft axis is restricted by the e-ring on one side and the third portion of the shaft on the other side.

13. A device for bleeding a master cylinder, comprising:
a shaft including a cylindrical portion;
means for affixing the shaft temporarily to a master cylinder, wherein the shaft is prevented from substantial translational motion during a bleeding process, and wherein the shaft is prevented from substantial rotational motion during the bleeding process;
a handle coupled to the shaft through a fixed joint and rotatably movable with respect to the shaft;
a movable joint coupled to the handle and rotatably movable with respect the handle, wherein the axis of rotation of the movable joint is parallel to the axis of rotation of the handle; and
a push rod, wherein the push rod is coupled to the movable joint;
wherein the push rod is oriented along an axis perpendicular to the rotation axis of the movable joint, whereby the push rod can engage a master cylinder piston when the handle is rotated toward the piston.

14. The device of claim 13, wherein the push rod is coupled to the movable joint through a threaded bore within the movable joint, and wherein the push rod means is movable with respect to the movable joint by use of a threading operation,
whereby the push rod can engage a master cylinder piston when the clamp handle remains stationary and the push rod is rotated in a clockwise manner when a threaded portion of the push rod is in contact with the threaded bore of the movable joint.

15. An apparatus for bleeding a master cylinder detached from a vehicle, comprising:
a shaft including a first portion having a cylindrical cross-section and a second portion having a substantially square cross-section;
a first clamp rod and a second clamp rod for temporarily affixing the shaft to a master cylinder and being mounted respectively on the first and second portions of the shaft;
a handle having two prongs and being rotatably coupled to the cylindrical portion of the shaft;
a screw rod joint rotatably coupled to the handle; and
a screw rod including a threaded portion, wherein the screw rod is coupled to the clamp handle by threading the screw rod within a screw rod joint cylindrical bore.

* * * * *